April 17, 1928.
J. L. PIATT
TIRE CHAIN CLIP
Filed June 25, 1927
1,666,397
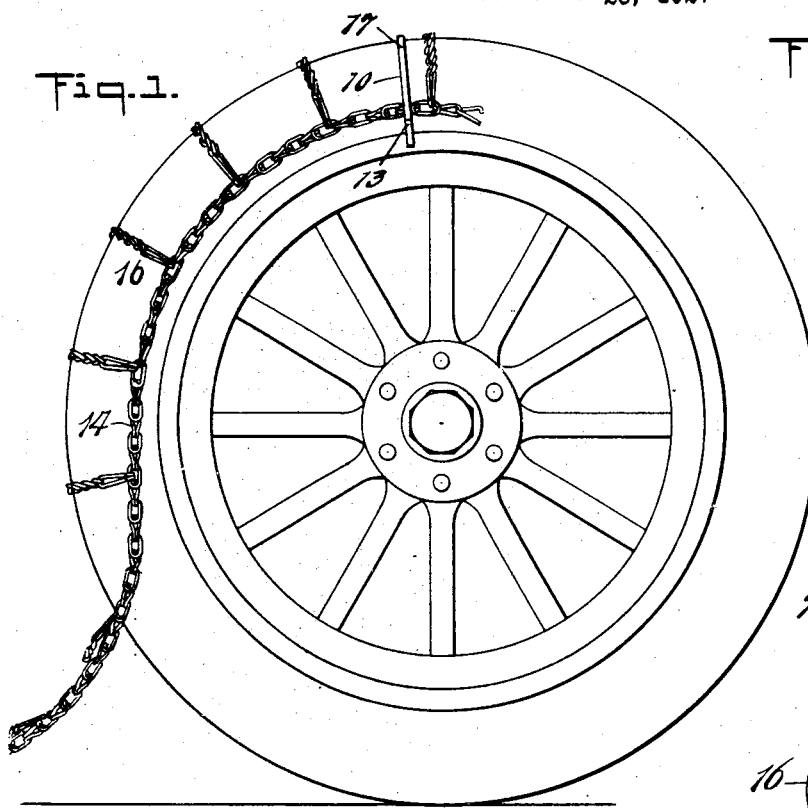
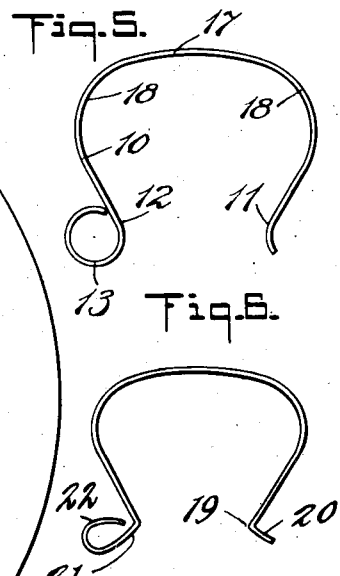
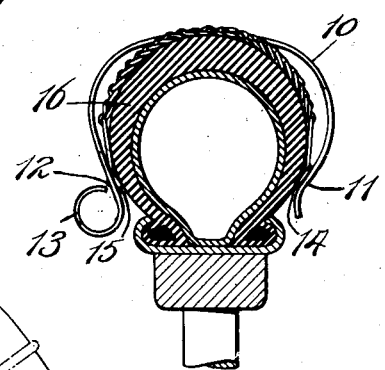
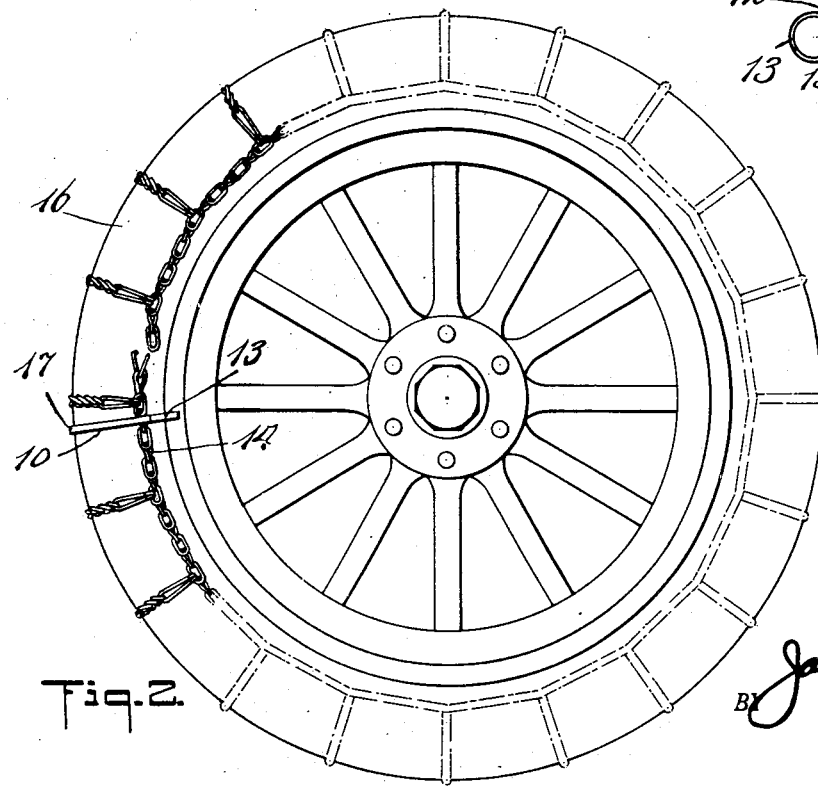
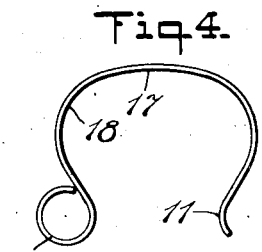
INVENTOR.
James L. Piatt
BY H. R. Johns
ATTORNEY Patented Apr. 17, 1928.

1,666,397

UNITED STATES PATENT OFFICE.

JAMES L. PIATT, OF WILKES-BARRE, PENNSYLVANIA, ASSIGNOR TO PAUL S. WAR-
RINER, OF WILKES-BARRE, PENNSYLVANIA.

TIRE CHAIN CLIP.

Application filed June 25, 1927. Serial No. 201,396.

This invention relates to means for putting on an anti-skid tire chain without the necessity of jacking up the wheels. It has for its object to provide a quick, simple and inexpensive device of this character which is also adapted for various sizes of tires, including the over-size or balloon tires.

A number of previous attempts have been made to attach a chain to a tire without the aid of jacks. Some of these have included clamps secured under the rim or over the tire and to which hooks or chains are attached and the tire chain fastened to these hooks or auxiliary chains. One objection to such proposals has been the time it takes to fasten and unfasten the chain to the hook or auxiliary chain or whatever is used. A further objection has been that the clips passing over the tire do not hold satisfactorily, but tend to come off when the tire is partially deflated causing a bulge and spreading the clamp with the resultant loss of clamping effect.

Under the present invention these disadvantages are overcome and a saving in time effected through eliminating the necessity for engaging a tire chain link with a hook or auxiliary chain.

According to this invention a tire chain clip is provided which comprises compressor portions, at least one of which is resiliently mounted, although in the preferred form they comprise the spaced ends of a generally U-shaped clamp of good quality spring steel. These compressor portions are shaped to slide into position on the wheel, clamping opposite side portions of an anti-skid chain against the tire. The bridging means connecting these portions is preferably so shaped as to permit a complete revolution of the wheel on the ground.

One end of the tire chain preferably is placed on the tire, the clip being placed over this end of the chain to hold it in position, and the wheel then rotated so that the clip rides down the front side, under the wheel in contact with the ground, and up the rear side until the opposite end of the chain is in a convenient position to be secured to the end adjacent the clip.

Referring to the drawing Fig. 1 shows the first position in the application of the present invention to the operation of putting on a tire chain.

Fig. 2 shows a substantial completion of the operation with the ends of the tire chain in position to be fastened.

Fig. 3 is a section through the tire showing the clip in position.

Fig. 4 shows one form of tire chain clip.

Fig. 5 shows another form of tire chain clip for the larger and over-size tires.

Fig. 6 is a modified construction of a clip.

The clip 10 is of good quality spring steel formed to the general U-shape indicated and then tempered as is customary in the treatment of spring steel. The clip comprises the spaced ends or compressor portions 11 and 12 connected by the bridging portion 17 of such a size to extend around the tire as shown in Fig. 3. One end of the anti-skid chain is placed on the tire in position shown in Fig. 1 when the clip 10 is slid in position with the compressor portions 11 and 12 clamping the opposite side portions 14 and 15 of the anti-skid chain onto the tire 16 and preferably just back of the first transverse section of the chain illustrated.

After clamping one end of the chain to the tire, as illustrated in Fig. 1 and with the rest of the chain preferably stretched out on the ground behind the wheel so as to facilitate its being pulled on to the tire, the wheel is rotated in a clockwise direction in the illustration pulling the chain around its periphery until the entire chain is on the wheel and the end first applied has moved around to a point just below the rear edge of the fender, or substantially three-quarters of a revolution, when the usual fastening means can be easily manipulated to securely attach the chain to the tire. The clip is so shaped as to maintain the chain in position as it passes in contact with the ground even if the tire be partially deflated. For this reason the bridging portion 17 is made preferably wider than the spacing between the compressor portions 11 and 12 and the connection 18 between the spaced compressor portions and the bridging portion is gradually curved so as to avoid any localized excessive bending moment. If the tire is partially deflated the bulge adjacent the tread would spread the compressor portions and loosen the chain if provision were not made to permit such bulge into the portion 18 which does not contact with the tire surface when fully inflated as shown. This is especially true of the over-size of balloon tires. Having the bridging portion 17 flattened also lessens the tendency for the compressor portions to spread under partial deflation of the tire.

If it should not be convenient to attach the clip and chain end as illustrated, it could of course be attached lower on the wheel and on either the forward or rear side. The vehicle is then moved in a direction to pull the chain around the tire.

For convenience the clip is preferably formed with a ring 13 adjacent one of the compressor portions which serves as a hand or finger grip enabling the clip to be easily slid in position or removed.

In practice it has been found a flat spring about $\tfrac{7}{16}''$ wide is sufficient for all sizes and that production of the clip in this invention in three sizes will take care of substantially all existing tire sizes. For example the small size clip is preferably made of No. 14 gauge spring steel of the general shape illustrated in Fig. 4. This has been found suitable for tires varying in size from about 4.40'' to 5.00''. The medium size clip is made also of No. 14 gauge spring steel and is adapted for tire sizes from about 5.25'' to 6.00''. The large size is of the general shape illustrated in Fig. 5 and made of No. 12 gauge spring steel for tire sizes 6.20'' to 7.20''. These sizes mentioned are merely by way of illustration and it will be found a clip is adapted to take tire sizes larger or smaller than that intended.

While the clip is made of spring steel and any type of good quality spring steel may be used, the following analysis is given for such a steel of standard specification:

| | |
|---|---|
| Carbon | 0.90 to 1.10 |
| Manganese, max. | 0.50 |
| Phosphorus, max. | 0.05 |
| Sulphur, max. | 0.05 |

Among the advantages of this invention may be mentioned particularly the facility of operation whereby the chain may be put on the tire without the aid of jacks and quickly. Both chains may be placed on the wheels simultaneously by the use of two clips. The clips are shaped to successfully operate with various tire sizes and to properly function even if a tire is partially deflated. As distinguished from previous attempts in applying tire chains without jacks, there are no hooks or auxiliary chains or additional fastening means necessary to take the time of the operator since the end of the tire chain is frictionally held in place by the clip, the compressor portions holding the chain in position during rotation of the wheel. With wooden or wire wheels the clip will successfully operate if placed around the rim inside the tire, but it is preferable to have the clip applied on the outside because of the shape of the tire. Then again use of the clip on the outside in the manner intended is easier, cleaner and adapted for all types of wheels. Use of the clip inside the tire is likely to scratch the paint.

While the foregoing method of using the clip is preferred, it may also be applied to the tire before the chain and then an end transverse section of the chain put on just ahead of the clip when portions of the chain will be wedged between the tire and the slight outward flare of the ends of the compressor portions. The end transverse section being in front of and contiguous the clip, and the side portions of the chain being under, a backward pull or tension due to the weight of the chain causes the portion of the chain adjacent the places where said end transverse section is attached to the side portions to be pulled or wedged beneath said slightly outwardly flared portions. When partly wedged under the clip the end of the chain first applied will not fall off as this end is rotated beneath a horizontal plane through the wheel axis. While the slight outward flare to the clip ends is primarily to facilitate slipping the clip over the tire, it may thus serve also to permit the chain to be wedged partly under the clip when the clip is applied to the tire independently of or before the chain.

The clip of Fig. 6 has the ends of the compressor portions bent sharply outwardly at 19 but is otherwise the same as the preferred form of clip in Figs. 1 to 5. Without the gradual flare at the ends, this form of clip is not as easily applied and the chain can not readily be wedged under the clip if the clip is applied before the chain. However, when the chain is put on first, this type of clip can function as a clamp over the chain in the preferred manner previously described. This type of clip may also be used when the clip is applied before the chain but in a different manner. In such case after the clip is in place on the tire, an end transverse chain section is placed contiguous and in front of the clip with the side portions extending rearwardly under the projections 20 and 21, but not clamped between the tire and compressor portions. The drag on the chain, due to its weight, is sufficient to keep the first applied end from falling off as the wheel rotates. Due to this tension, the side portions of the chain press the end transverse section of the chain contiguous the clip onto the tire tread as they tend to raise or swing the projecting ends 20 and 21 outwardly. A finger grip 22 is provided for this modification.

If desired, the finger grip 13 may be omitted and the end of compressor portion 12 made to correspond in shape with the end of compressor portion 11, when the clip will function satisfactorily but can not be applied as easily. The use of the single finger grip 13 on the outside as shown is preferred because a finger grip on the inner side would with some automobiles be unsatisfactory on account of lack of clearance, and would tend to dislodge the clip if the wheel were in a rut or in deep mud.

I claim:

1. A tire chain clamp constructed to fit over the tread of the tire and clamp a portion of the chain contiguous opposite inclined sides inwardly of the widest part, said clamp being shaped to be out of contact with said tire at its widest part to securely hold said chain against the tire under increase of the tire width with partial deflation.

2. A tire clamp constructed to fit over the tire tread and cooperate with the opposite inclined sides of the tire inwardly of its widest part, said clamp being shaped to be out of contact with said tire at its widest part, the sides of said clamp being shaped to engage and retain a tire chain adjacent the tire and said clamp, and the clamping portions being shaped to facilitate sliding in and out on contact with the ground under lateral bulging of the tire and while clamping the sides of the tire.

3. A tire chain clamp comprising compressor portions, at least one of which is resiliently mounted, shaped to slide into position on a wheel clamping or gripping opposite sides of part of an anti-skid chain against the tire, and means connecting said compressor portions and shaped to permit substantially a complete rotation of the wheel on the ground without reducing the clamping of said part of the chain against the tire under partial deflation.

4. A tire chain clip of general U-shape formed of tempered spring steel, the spaced ends being constructed to clamp opposite sides of an anti-skid chain against the tire at different places along said spaced ends, the bridge portion of said clip connecting the spaced ends being of substantially greater width than the spacing of said clamping ends, and being flattened and connected to the spaced ends by gradually curved portions, and a grip secured adjacent one of said spaced ends.

5. A tire chain clip comprising compressor portions at least one of which is resiliently mounted, shaped to slide into position on a wheel clamping opposite sides of part of an anti-skid chain against the tire and means connecting said compressor portions shaped to extend around the outside of the tire and permit substantially a complete rotation of the wheel on the ground while clamping said part of the chain against the tire, said connecting means being of substantially greater width than the spacing of said compressor portions, and a grip formed by bending a portion of the material of said clip adjacent one of said compressor portions.

In witness whereof I have hereunto set my hand this 23rd day of June, 1927.

JAMES L. PIATT.